US012664662B2

(12) United States Patent
Keller et al.

(10) Patent No.:  US 12,664,662 B2
(45) Date of Patent:      Jun. 23, 2026

(54) DETECTION METHOD FOR DETECTING STATIC OBJECTS

(71) Applicant: HELLA GmbH & Co. KGaA, Lippstadt (DE)

(72) Inventors: Friedrich Keller, Lippstadt (DE); Michael Skutek, Erwitte (DE); Carolin Santuens, Geseke (DE); Wladimir Fischer, Liesborn (DE); Samra Hrnjicic, Erwitte (DE); Simon Dwucet, Emsbueren (DE)

(73) Assignee: Hella GmbH & Co. KGaA, Lippstadt (DE)

( * ) Notice:  Subject to any disclaimer, the term of this patent is extended or adjusted under 35 U.S.C. 154(b) by 301 days.

(21) Appl. No.: 18/135,389

(22) Filed: Apr. 17, 2023

(65) Prior Publication Data

US 2023/0260132 A1      Aug. 17, 2023

Related U.S. Application Data

(63) Continuation of application No. PCT/EP2021/077274, filed on Oct. 4, 2021.

(30) Foreign Application Priority Data

Oct. 15, 2020    (DE) ..................... 10 2020 127 171.9

(51) Int. Cl.
        *G06T 7/12*          (2017.01)
        *G06T 3/40*          (2006.01)
        *G06T 7/60*          (2017.01)

(52) U.S. Cl.
        CPC .................. *G06T 7/12* (2017.01); *G06T 3/40* (2013.01); *G06T 7/60* (2013.01); *G06T 2207/10028* (2013.01); *G06T 2207/30252* (2013.01)

(58) Field of Classification Search
        CPC .... G06T 7/12; G06T 3/40; G06T 7/60; G06T 2207/10028; G06T 2207/30252
        See application file for complete search history.

(56) References Cited

U.S. PATENT DOCUMENTS

2007/0096974 A1      5/2007  Gleacher et al.
2010/0155156 A1*    6/2010  Finkelstein ............ B25J 19/021
                                                                        901/1
2017/0371338 A1*   12/2017  Kamata .................. G05D 1/024

OTHER PUBLICATIONS

International Search Report dated Jan. 5, 2022 in corresponding application PCT/EP2021/077274.
Bansal, M. et al: "2D Object Recognition Techniques: State-of-the-Art Work" Archives of Computational Methods in Engineering (2021) 28, Feb. 18, 2020, pp. 1147-1161, doi: 10.1007/s11831-020-09409-1.
Chen, L. et al: "MaskLab: Instance Segmentation by Refining Object Detection with Semantic and Direction Features" Conference on Computer Vision and Pattern Recognition, Dec. 2017, pp. 4013-4022.
Lu, Y. et al:"Efficient Object Detection for High Resolution Images" fifty-third Annual Allerton Conference, Illinois, Sep. 29-Oct. 2, 2015, pp. 1091-1098.

* cited by examiner

*Primary Examiner* — Adnan M Mirza
(74) *Attorney, Agent, or Firm* — Muncy, Geissler, Olds & Lowe, P.C.

(57)                ABSTRACT
A detection method for detecting static objects in surroundings of a vehicle, and a vehicle.

13 Claims, 3 Drawing Sheets

300

301

DETECTION METHOD FOR DETECTING STATIC OBJECTS

This nonprovisional application is a continuation of International Application No PCT/EP2021/077274, which was filed on Oct. 4, 2021, and which claims priority to German Patent Application No 10 2020 127 171.9, which was filed in Germany on Oct. 15, 2020, and which are both herein incorporated by reference.

BACKGROUND OF THE INVENTION

Field of the Invention

The present invention is directed to a detection method for detecting static objects for a multiplicity of different receiving functions.

Description of the Background Art

A detection of static surroundings is necessary for various driver assistance functions, for example a parking distance control, an automated parking, and for multiple levels of autonomous driving.

In contrast to dynamic object tracking, multiple representation levels are necessary for a static object capture, depending on the receiving function. For example, static object boxes are sufficient as input data for a warning function as the receiving function, which does not require a minimal bandwidth and resolution.

An autonomous parking function or an autonomous driving function requires precise contour information with regard to the static surroundings. Input data are therefore needed which have a much higher resolution and bandwidth than in the case of a warning function.

The storage space and the computing resources in control devices in the automotive sector are typically extremely limited. A parallel capture and calculation of static surroundings is therefore not always possible on all possible representation levels.

Methods for detecting static objects are known, in which particular measured values determined by a sensor are assigned to a particular grid cell of a grid system and, when a measured value is assigned to a grid cell, the cell value thereof is increased. The cell value typically represents a probability of an occupation or a presence of an object. In a subsequent processing step, all occupied grid cells are chained to extract a geometry of the static surroundings and to separate the static object around a particular vehicle. The geometric resolution of this approach is in direct correlation with the dimension of particular grid cells. The memory consumption and the computational effort depend on the number of grid cells and increase exponentially as the resolution or the field of vision increases.

The resolution of a system operated as described above is limited to a particular resolution of the grid cells. Different resolutions require different calculations.

Another approach is, for example, to store and validate detections for multiple measurement cycles. A memory consumption and a computational effort in this approach is directly associated with a number of stored detections and thus indirectly with a sensor field of vision, a necessary resolution, and an instantaneous number of measurements. The resolution of a system of this type is limited to the resolution of the detections. Different resolutions require a separate calculation using different memory configurations.

SUMMARY OF THE INVENTION

It is therefore an object of the present invention to provide to overcome the disadvantages mentioned above. In particular, an object of the presented invention is to provide a possibility for adapting a resolution of a detection method for detecting static objects for a multiplicity of different receiving functions.

According to an exemplary embodiment, a detection method for detecting static objects in surroundings of a vehicle is presented to achieve the object mentioned above.

The detection method comprises a determination step, in which environment data are determined with the aid of at least one sensor of the vehicle and provided as a determination data set, the at least one sensor capturing the surroundings of the vehicle; a cluster step, in which a multiplicity of items of environment data from the determined environment data are combined into multiple clusters, based on their geometric characteristics, and provided as a cluster data set; a segmentation step, in which at least a portion of the multiple clusters are combined into at least one geometric segment having a contour predefined by the multiple clusters and provided as a segment data set; an abstraction step, in which a geometric enveloping structure having a predefined contour is assigned to a particular geometric segment and surrounds the particular geometric segment, and data of particular enveloping structures are provided as an enveloping structure data set.

According to the presented detection method, depending on a resolution requirement provided by a particular receiving function executed on a control device of the vehicle, either the determination data set or the cluster data set or the segment data set or the enveloping structure data set is provided to the receiving function for further processing.

In the context of the provided invention, environment data are understood to be measurement data which were determined by a sensor for capturing surroundings. In particular, environment data are measured values, determined, for example, by a radar sensors, of radar beams reflected by objects in the surroundings of the radar sensor. Environment data may, of course, also be determined with the aid of all other technically suitable sensors for capturing surroundings, for example camera sensors, ultrasonic sensors, or laser scanners.

In the context of the presented invention, a cluster can be understood to be an accumulation of multiple measuring points, the measuring points each being separate data objects.

In the context of the presented invention, a segment can be understood to be a data object, which has a contour corresponding to a sequence of particular clusters comprising the segment, i.e. segment points. Based on its particular contour, a segment may be assigned to a real object, for example using a machine learning system.

In the context of the presented invention, an enveloping structure can be understood to be a data object which has a geometric structure of a predefined shape, for example a rectangle, and which is formed around a segment and provides information about a position of the geometric structure in a coordinate system and/or an assignment of the corresponding segment to a particular real object.

In the context of the presented invention, a receiving function can be understood to be a function implemented on a control device, which receives and further processes a data set which was determined with the aid of the presented detection method. For example, a receiving function may be a warning function for warning against an impending collision of a vehicle with an object in surroundings of the vehicle or an autonomous driving function. Depending on the type of receiving function, the latter predefines a resolution request for a minimum resolution of a representation of surroundings for a data set to be provided to the receiving function.

The presented invention is based on the principle that environment data determined by a surroundings sensor are successively compressed in multiple method steps, i.e., reduced in their resolution and/or bandwidth. Correspondingly, a receiving function may be provided with a specific data set, which meets the particular requirements of the receiving function with a minimal resolution or bandwidth. Correspondingly, memory and calculation resources of a control device executing the receiving function may be spared by the specific data set.

In the determination step according to the invention, environment data may be determined in multiple measurement cycles with the aid of a surroundings sensor. Correspondingly, the surroundings or an area around a vehicle may be scanned at a frequency predefined, for example, by a particular surroundings sensor, so that new data sets including environment data are successively provided.

Since when using high-resolution surroundings sensors, for example laser scanners, large amounts of data are generated which result in correspondingly large determination data sets, which, in turn, require considerable computational effort for processing, the presented detection method facilitates a reduction of particular determination data sets for the purpose of reducing or minimizing memory and computational resources needed to process the environment data.

It may be provided that a) the determination step, b) the cluster step, c) the segmentation step, and d) the abstraction step are carried out successively one after the other, a resolution of particular provided environment data being successively reduced from the determination data set to the enveloping structure data set.

To reduce a data quantity, in particular a resolution and/or bandwidth of environment data, the presented detection method comprises multiple processing steps, which each provide a specific data set, which may be processed by a receiving function and/or a subsequent processing step. The particular processing steps successively result in a smaller data set or a correspondingly lower resolution of the environment data.

It may furthermore be provided that, during the determination step, multiple determination data sets are determined in multiple measurement cycles, and during the cluster step, each point cloud measurement of a particular determination data set is assigned to a particular cluster, which corresponds to a center of the point cloud measurements of the determination data set, particular clusters of particular determination data sets being combined into a composite cluster if a distance of the particular clusters between two consecutive measurements is less than a predefined distance threshold value.

To assign particular measuring points of a determination data set to a cluster and correspondingly reduce a resolution of the determination data set, geometric properties of particular measuring points of a determination data set may be evaluated. Measuring points associated with each other may be combined into a cluster, based on geometric characteristics, such as a spatial proximity. In particular, a distance of particular measuring points is suitable for recognizing a spatial relationship between particular measuring points. For example, if a distance between particular measuring points remains constant over different consecutive measurements or changes only within a predefined variance, it may be assumed that the particular measuring points represent a cohesive geometric structure, for example a traffic light. Correspondingly, a preselection of measuring points from a totality of measuring points may be made by assigning measuring points of this type to a cluster, by means of which the resolution of a corresponding cluster data set is reduced with respect to a corresponding determination data set.

It may furthermore be provided that the cluster data set determined in the cluster step is provided to at least one high-resolution receiving function of the control device, which requires environment data as a resolution request, which has a resolution dependent on a velocity of the vehicle and a range of the at least sensor and is greater, for example, than a predefined cluster threshold value.

A receiving function which requires a resolution dependent on a velocity of the vehicle and a range of the at least one sensor, for example an autonomous driving function, requires a detailed representation of surroundings, so that a further reduction of the resolution is no longer advantageous. Correspondingly, it is provided that a detailed data set, namely the cluster data set, is made available to a receiving function of this type.

It may furthermore be provided that, in the segmentation step, a real object is assigned to each segment, and particular clusters are assigned to a particular segment, based on predefined geometric criteria.

Due to the segmentation step provided according to the invention, particular clusters are assigned to a particular segment, so that a segment comprises multiple clusters, and a resolution of the segment data set is reduced with respect to a resolution of the cluster data set.

A segment may comprise particular clusters as segment data points for the purpose of representing a contour of a real object. Correspondingly, a segment may be assigned to a real object.

A machine learning system, for example an artificial neural network or a support vector machine, may be used to assign a segment to a real object. The machine learning system may be trained on the basis of training data already assigned to particular real objects.

It may furthermore be provided that, in the segmentation step, particular clusters are assigned to a segment which are situated at a distance from a line by no more than a predefined distance threshold value, the line being formed by subsequent clusters in each case.

By assigning clusters which are situated at a distance from a line by no more than a predefined distance threshold value, the line being formed by subsequent clusters in each case, clusters of this type are assigned with a high probability to a segment which represents a common structure or a common real object.

It may furthermore be provided that, in the abstraction step, the following parameters are assigned to a particular enveloping structure: position in a coordinate system, width, length, height, and orientation.

By assigning a particular segment to an enveloping structure having a predefined geometric shape, a resolution of the enveloping structure data set is reduced with respect to a resolution of the segment data set. The enveloping structure data set comprises only information about a number of enveloping structures and their position in a coordinate system. Correspondingly, the enveloping structure data set is suitable for receiving functions which have little demand for a resolution of the environment data, for example a warning function for warning against a collision of a vehicle with an object in the surroundings of the vehicle. A warning function requires only rough information on whether an object is situated in a traffic lane of a vehicle; precise dimensions of the object are not relevant, since the enveloping structure provided according to the invention provides a frame around the object.

It may furthermore be provided that a geometric shape from the following list of geometric shapes is selected as the enveloping structure: quadrangle, triangle, polygon.

A segment may be roughly surrounded by a quadrangle as the enveloping structure, so that a resolution of a segment data set may be efficiently reduced.

A triangle as the enveloping structure makes it possible to represent an orientation of a real object.

A polygon as the enveloping structure makes it possible to represent salient geometric features, for example projections of a real object, so that an area of a particular enveloping structure may be minimized and, for example, unnecessary collision warnings may be minimized.

In a second aspect, the presented invention relates to a vehicle, which includes a control device. The control device is configured to carry out a possible embodiment of the presented detection method.

The control device of the vehicle may be a processor, an ASIC, a control unit or any other programmable element.

It may be provided that the vehicle comprises a sensor from the following list or a combination thereof as at least one sensor: LIDAR sensor, radar sensor, ultrasonic sensor, laser sensor, camera sensor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
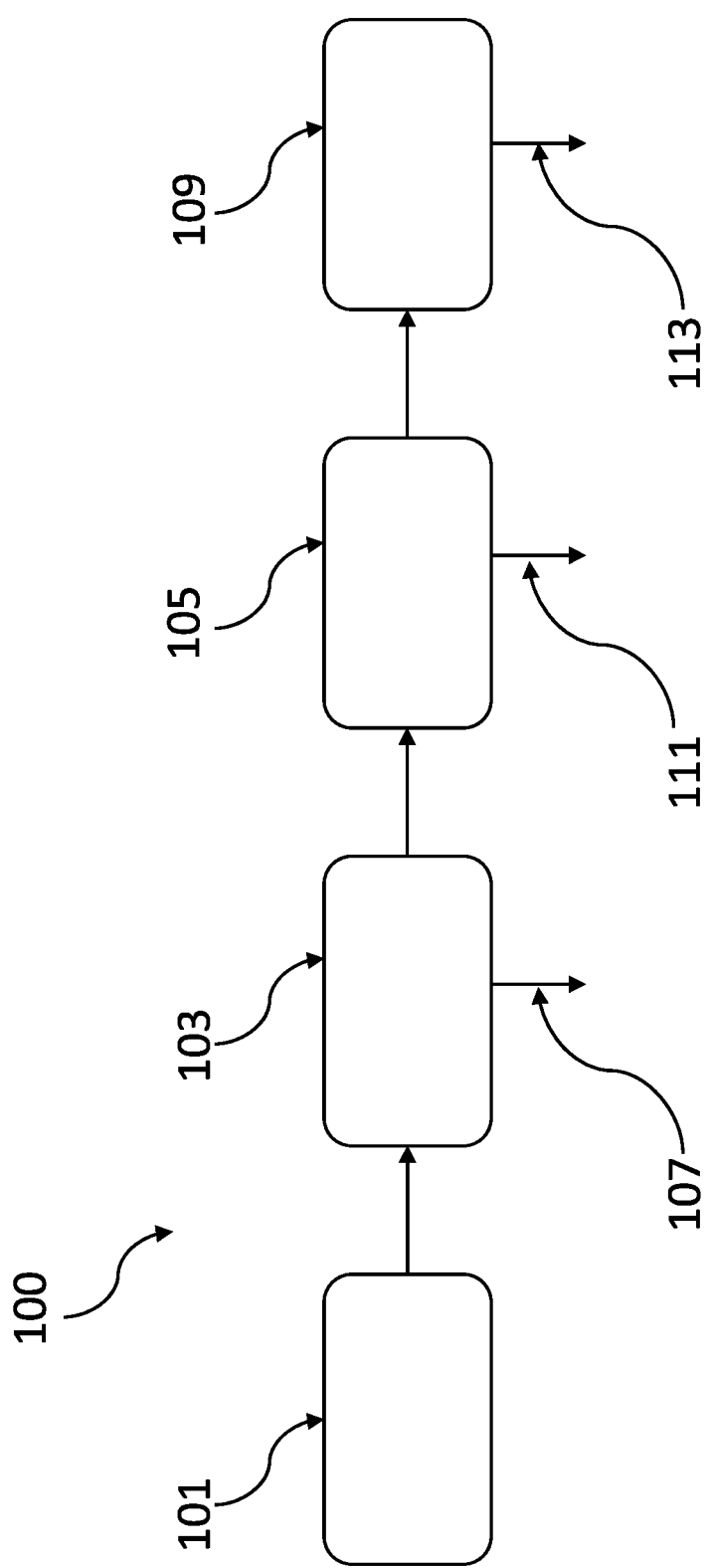
FIG. 1 shows an example of the detection method according to the invention.

A sequence of a possible embodiment of detection method 100 according to the invention is illustrated in FIG. 1.

In a determination step 101, environment data are determined with the aid of at least one sensor of a vehicle, for example a laser scanner, possibly filtered, and provided as a determination data set, i.e., stored, for example, in a memory.

In a cluster step 103, a multiplicity of items of environment data from the determined environment data are combined into multiple clusters, based on their geometric characteristics, and provided as a cluster data set, as indicated by arrow 107.

In a segmentation step 105, at least a portion of the clusters determined in cluster step 103 is combined into at least one geometric segment having a contour specified by the multiple clusters and provided as a segment data set, as indicated by arrow 111.

In an abstraction step 109, a geometric enveloping structure having a predefined contour is assigned to a particular geometric segment and surrounds the particular geometric segment. Data, such as a position, or an extension in length, width, and height of particular enveloping structures, are provided as an enveloping structure data set, as indicated by arrow 113.

In a provision step, the determination data set or the cluster data set or the segment data set or the enveloping structure data set is provided to a particular receiving function, depending on a resolution requires specified by the receiving function, as indicated by arrows 107, 111, and 113, respectively.

Figure 2:
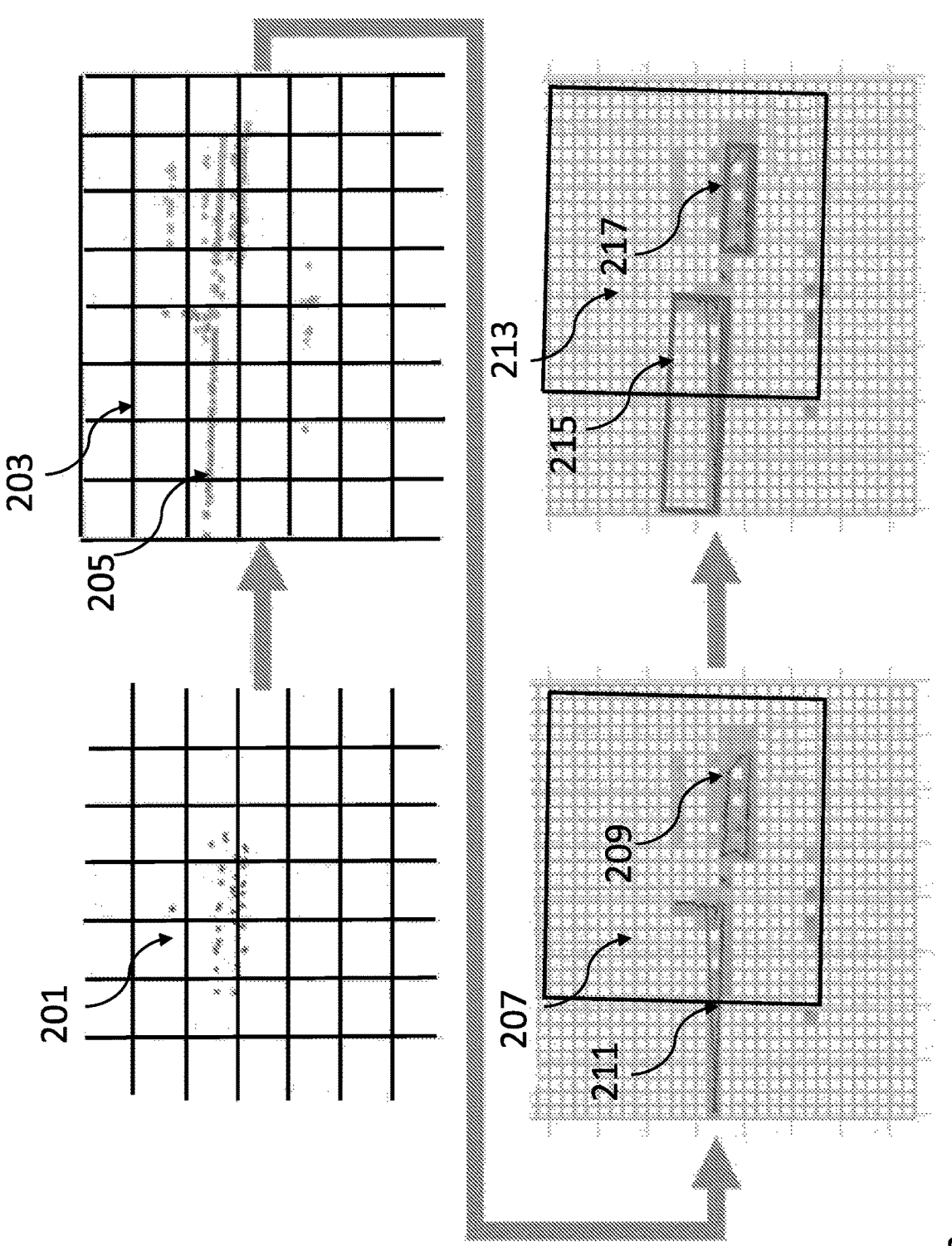
FIG. 2 shows a schematic representation of a sequence of an example of the detection method according to the invention.

The method steps described in FIG. 1 are visualized in FIG. 2, based on a measurement example.

Environment data 201 determined by a sensor are provided as a determination data set having a very high resolution.

A cluster data set including cluster data 203 comprises a multiplicity of clusters 205, which comprise, for example, environment data which have moved away from each other by less than a predefined threshold value between two measurement cycles of the sensor.

In the present case, a segment data set including segment data 207 comprises data relating to two segments 209 and 211, which in each case comprise a plurality of clusters 205 as segment data points. Correspondingly, segments 209 and 211 have a shape which follows a contour of a real object and these segments may be assigned to the real object, for example using a machine learning system.

An enveloping structure data set comprises enveloping structure data 213 relating to two enveloping structures 215 and 217, which in each case envelop one of segments 209 and 211. In particular, the enveloping structure data set comprises only information about where particular enveloping structures are present in a coordinate system, so that detailed information about a shape of particular detected objects is omitted, and the enveloping structure data set has a minimal resolution, by means of which a minimal computational effort and storage effort is required when processing the enveloping structure data set.

Figure 3:
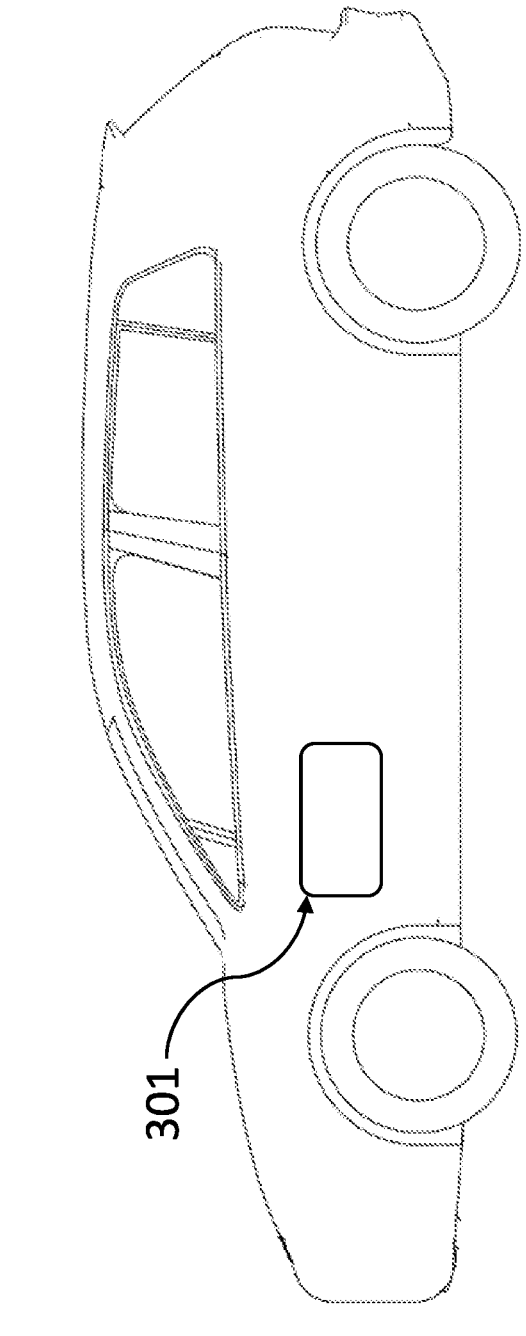
FIG. 3 shows an example of the vehicle according to the invention.

A vehicle 300 is illustrated in FIG. 3. Vehicle 300 comprises a control device 301, which is configured to carry out detection method 100.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A detection method to detect static objects in surroundings of a vehicle to assist execution of receiving functions on a control device of the vehicle, the detection method comprising:

a determination step, in which environment data are determined by at least one sensor of the vehicle and provided as a determination data set, the at least one sensor capturing the surroundings of the vehicle to determine the environment data;

a cluster step, in which a multiplicity of items of the environment data are combined, via the control device, into multiple clusters, based on geometric characteristics of the environment data, and provided as a cluster data set;

a segmentation step, in which at least a portion of the multiple clusters is combined, via the control device, into at least one geometric segment having a contour specified by the multiple clusters, and provided as a segment data set;

an abstraction step, in which a geometric enveloping structure having a predefined contour is assigned, via the control device, to a particular geometric segment and surrounds the particular geometric segment and data of particular enveloping structures are provided as an enveloping structure data set; and a provision step, wherein depending on a resolution request provided by a particular one of the receiving functions executed on the control device of the vehicle, either the determination data set, the cluster data set, the segment data set or the enveloping structure data set is provided to the particular one of the receiving functions for further processing to execute a vehicle function associated with the particular one of the receiving functions.

2. The detection method according to claim 1, wherein the determination step, the cluster step, the segmentation step, and the abstraction step are successively carried out one after the other, and wherein a resolution of the environment data is successively reduced from the determination data set, to the cluster data set, to the segment data set and to the enveloping structure data set.

3. The detection method according to claim 1, wherein, in the determination step, multiple determination data sets are determined in multiple measurement cycles, and in the cluster step, each point cloud measurement of a particular determination data set is assigned to a particular cluster, which corresponds to a center of the point cloud measurements of the determination data set; and particular clusters of particular determination data sets are combined into a composite cluster when a distance of the particular clusters is less than a predefined distance threshold value between two consecutive measurements.

4. The detection method according to claim 1, wherein the cluster data set determined in the cluster step is provided to at least one high-resolution receiving function of the control device, when the resolution request requires environment data having a resolution dependent on a velocity of the vehicle and a range of the at least one sensor.

5. The detection method according to claim 1, wherein, in the segmentation step, a real object is assigned to each segment, and wherein clusters are assigned to a particular segment based on predetermined geometric criteria.

6. The detection method according to claim 1, wherein, in the segmentation step, particular clusters are assigned to a segment which are situated at a distance from a line by no more than a predefined distance threshold value, the line being formed by subsequent clusters in each case.

7. The detection method according to claim 1, wherein, in the abstraction step, parameters assigned to a particular enveloping structure include: position in a coordinate system, width, length, height, and/or orientation.

8. The detection method according to claim 1, wherein a geometric shape selected as the enveloping structure include: a quadrangle, a triangle, or a polygon.

9. A vehicle comprising:

a control device, the control device being configured to carry out the detection method according to claim 1.

10. The vehicle according to claim 9, wherein the vehicle comprises at least one sensor including a LIDAR sensor, a radar sensor, an ultrasonic sensor, a laser sensor, and/or a camera sensor.

11. The detection method according to claim 1, wherein the receiving functions of the vehicle include driver assistance functions and warning functions, wherein the driver assistance functions include parking distance control, automated parking and autonomous driving.

12. The detection method according to claim 1, wherein the resolution request indicates a minimum resolution of a representation of the surroundings of the vehicle that is required in a data set to be provided to the respective receiving functions.

13. The detection method according to claim 1, wherein the control device is a processor.

* * * * *